June 4, 1940.    T. M. FERRILL, JR    2,203,258
DISTRIBUTING APPARATUS
Filed May 21, 1938
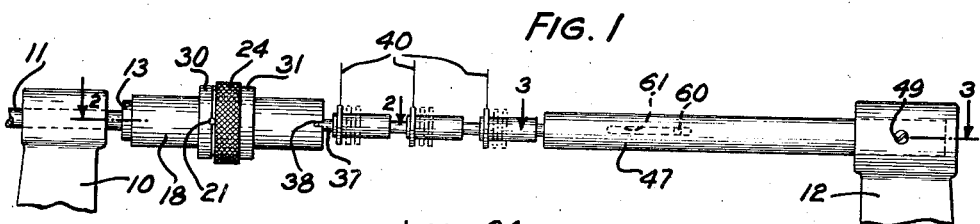
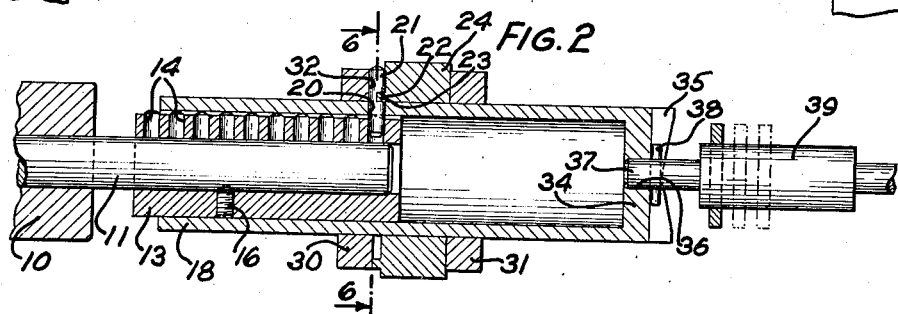
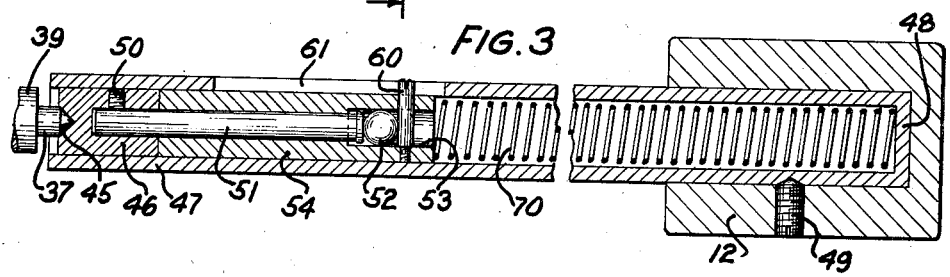
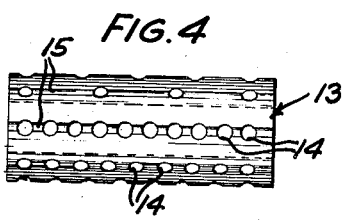
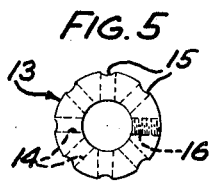
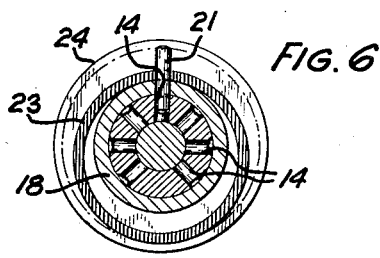
INVENTOR
T. M. FERRILL JR.
BY Emery Robinson
ATTORNEY Patented June 4, 1940

2,203,258

UNITED STATES PATENT OFFICE 2,203,258

DISTRIBUTING APPARATUS

Thomas M. Ferrill, Jr., West Hartford, Conn., assignor to Western Electric Company, Incorporated, New York, N. Y., a corporation of New York Application May 21, 1938, Serial No. 209,385

6 Claims. (Cl. 242—35.5)

This invention relates to distributing apparatus and more particularly to a spacing distributor for coil winding machines.

It is an object of the present invention to provide a simple and economical mechanism for accurately positioning an adjustable distributor.

In accordance with one embodiment of the invention, there is provided a cylindrical member adapted to be attached to the winding spindle of a coil winding machine and provided with a plurality of rows of holes, each row being differently spaced and each row having all the holes therein interconnected by a slot. A pin adapted to fit in any of the holes is mounted in an aperture in a sleeve which surrounds the cylindrical member and the pin has a slot therein cooperating with a manually operable cam surrounding the sleeve, whereby the pin may be transferred from one hole to another in the row of holes to move the sleeve step by step. The sleeve is provided with a groove for receiving the winding arbor, which has a pin adapted to engage in a slot in the end of the sleeve, and the arbor has its opposite end positioned in a bearing rotatable within a sleeve fixed in the tail stock of the machine and normally urged toward the winding spindle.

A better understanding of the invention may be had by reference to the accompanying drawing, wherein:

Fig. 1 is an elevational view of a distributor positioned between the tail stock and spindle of a winding machine and embodying the features of the present invention;

Fig. 2 is a sectional view, taken substantially along the line 2—2 of Fig. 1 in the direction of the arrows, showing the details of the spacing cylinder;

Fig. 3 is a sectional view taken along the line 3—3 of Fig. 1 in the direction of the arrows, showing the spring-pressed bearing mounted in the tail stock of the machine;

Fig. 4 is a detail plan view of the spacing cylinder;

Fig. 5 is an end view of the detail shown in Fig. 4, and

Fig. 6 is a sectional view, taken substantially along the line 6—6 of Fig. 2 in the direction of the arrows.

Referring to the drawing, wherein like reference characters designate the same parts throughout the several views, a bearing 10 rotatably supports a spindle 11 of a winding machine, the tail stock of which is shown at 12. The spindle 11 is rotatably mounted in the bearing 10 and may be driven from any suitable source of power, not shown. Fixed to the spindle 11 is a cylindrical member 13, shown in detail in Figs. 4 and 5, having seven rows of holes 14 formed therein, each row having a different number of holes therein, the number of holes in a row varying from four holes to the row to ten holes to the row. A relatively shallow groove 15 interconnects the holes in each row, one to another, to facilitate moving a pin, to be described hereinafter, from one hole to another in a row. This cylindrical member 13 is secured to the spindle 11 by means of a set screw 16 and has a sleeve 18 surrounding it. The sleeve 18 is slidable and rotatable on the cylindrical member 13 and is provided with an aperture 20, in which a pin 21 is normally positioned. The pin 21 has a slot 22 formed therein for receiving a cam 23 formed on a knurled ring 24. The cam 23 is formed eccentrically of the ring 24 and serves as a means for advancing or retracting the pin 21 into and out of the holes 14 in the cylindrical member 13. A pair of annular members 30 and 31 surround the sleeve 18 and serve to position the knurled ring 24, the member 30 having a notch 32 formed therein to cooperate with the pin 21.

It will thus be apparent that the rotating of the knurled ring 24 will withdraw the pin 21 from one of the holes 14 upon rotation of the ring 24 through 180 degrees, and further rotation of the ring 24, back to the position shown in Fig. 2, will move the pin 21 into one of the holes 14.

The right end of the sleeve 18 has an end wall 34 formed therein in which there is cut a slot 35 and in which there is formed a central aperture 36. The aperture 36 is adapted to receive the left end (Fig. 2) of an arbor 37, on which spools 39 are positioned for receiving servings of strand material 40. The arbor 37 has a pin 38 extending therethrough to engage in the slot 35, whereby rotation of the spindle 11 will transmit driving motion to the arbor 37.

The right end of the arbor 37 is pointed and engages in a depression 45 formed in a bearing 46. Surrounding the bearing 46 is a sleeve 47, which is closed at its right end (Fig. 3), as shown at 48, and which is mounted, by means of a set screw 49, in the tail stock of the winding machine. Fixed to the bearing 46, by means of a set screw 50, is a headed rod 51, which bears against a ball 52 positioned within a circular aperture 53 in a cylindrical member 54. A pin 60 is threaded into the cylindrical member 54 and extends upwardly therefrom into a slot 61 formed in the sleeve 47, whereby the member 54 is slidable longitudinally of the sleeve 47, but is held against rotation therein. However, the bearing 46 is rotatable in the sleeve 47 and the assembly, comprising the bearing 46, rod 51, and sleeve 54, is normally urged to the left (Fig. 3) by a compression spring 70 mounted within the sleeve 53 and bearing at its opposite ends against the closed end of the sleeve 47 at 48 and the cylindrical member 54.

It is believed that the utility of the invention will be more apparent from the following brief description of the mode of operation thereof.

After the apparatus has been positioned in a winding machine, with the sleeve 47 fixed in the tail stock 12 of the machine, and the cylindrical member 13 secured to the winding spindle 11, the arbor 37, having a plurality of spools 39 mounted thereon, may be inserted in the machine by pressing the pointed right end of the arbor 37 against the bearing 46 to move the bearing to the right (Figs. 1 and 3), whereby the left end of the arbor may be placed in the aperture 36 with the pin 38 engaging the slot 35. The operator may then select the row of holes 14 in the cylindrical member 13 which will provide the proper spacing of the servings of strand material 40 on the spools 39, and after performing a selecting operation, by rotating the cylindrical member 13 with respect to the sleeve 18, the knurled ring 24 may be rotated to move the pin 21 into the first or right-hand hole 14 in the row selected (Fig. 2). The winding operation may then be started, and after the left end servings have been wound on the spool 39 (Figs. 1 and 2), the spindle will be stopped and the arbor and its bearings may all be shifted to the left (Figs. 1, 2 and 3) by rotating the knurled ring 24 sufficiently to move the pin 21 out of the hole in which it was originally positioned and into the next succeeding hole to the left in the selected row, whereupon the knurled ring may be turned 180 degrees to lock the distributor in its new position. The hereinbefore-described operations may be repeated until the pin has been moved into the last or left-hand hole (Fig. 2) of the selected row, whereupon a new arbor 37 may be placed in the machine and the spacing of the servings of strand material 40 may be changed as desired.

Although a specific embodiment of the invention has been described hereinbefore, it will be understood that numerous modifications and adaptations may be made thereof without departing from the scope of the appended claims.

What is claimed is:

1. In a distributing apparatus, a cylindrical member having a plurality of pin-engaging apertures spaced about its periphery, a sleeve surrounding said cylindrical member and having a guide formed therein, a pin to be guided by said guide, and a manually operable cam surrounding the sleeve for positioning said pin in any of the apertures in the cylindrical member.

2. In a distributing apparatus, a winding spindle, an arbor adapted to be driven by said spindle, means for positioning said arbor axially in various spaced positions including a cylindrical member fixed to the spindle and having a plurality of rows of holes formed in its periphery, said holes being differently spaced in each row, a pin for insertion in any of said holes, and means for inserting said pin in any one of said holes comprising a rotatable cam for moving said pin into and out of said holes.

3. In a distributor, a spindle, a cylindrical member fixed to said spindle, said cylindrical member having a plurality of holes formed therein, a sleeve surrounding said cylindrical member, a pin movable in said sleeve and adapted to engage in the holes in said cylindrical member, and a manually operable means for shifting the pin from one hole to another in said cylindrical member.

4. In a distributor, a spindle, a cylindrical member fixed to said spindle, said cylindrical member having a plurality of holes formed therein, a sleeve surrounding said cylindrical member, a pin movable in said sleeve and adapted to engage in the holes in said cylindrical member, a manually operable means for shifting the pin from one hole to another in said cylindrical member, an arbor removably positionable in said sleeve, and means for urging said arbor toward said sleeve.

5. In a distributor, a spindle, a cylindrical member fixed to said spindle, said cylindrical member having a plurality of holes formed therein, a sleeve surrounding said cylindrical member, a pin movable in said sleeve and adapted to engage in the holes in said cylindrical member, a manually operable means for shifting the pin from one hole to another in said cylindrical member, a bearing, an arbor mounted between said sleeve and said bearing, and means for urging the arbor and bearing toward said sleeve.

6. In a spacing distributor, a spindle, a cylindrical member having a plurality of holes formed about the periphery thereof fixed to said spindle, a sleeve rotatable and slidable with respect to said cylindrical member, a cam-operated pin insertable in any one of the holes in the cylindrical member for fixing said sleeve with respect to the cylindrical member, a ring surrounding said sleeve, and a cam formed on one face of said ring for actuating said cam-actuated pin.

THOMAS M. FERRILL, JR.